(12) United States Patent
Hara et al.

(10) Patent No.: US 7,555,056 B2
(45) Date of Patent: Jun. 30, 2009

(54) COMMUNICATION APPARATUS AND METHOD

(75) Inventors: Kazutoshi Hara, Kawasaki (JP); Tetsuo Ido, Kawasaki (JP); Fumihide Goto, Naka-gun (JP)

(73) Assignee: Canon Kabushiki Kaisha, Tokyo (JP)

( * ) Notice: Subject to any disclaimer, the term of this patent is extended or adjusted under 35 U.S.C. 154(b) by 602 days.

(21) Appl. No.: 11/358,205

(22) Filed: Feb. 22, 2006

(65) Prior Publication Data

US 2006/0203833 A1  Sep. 14, 2006

(30) Foreign Application Priority Data

Mar. 2, 2005  (JP) .............................. 2005-057447

(51) Int. Cl.
*H04L 27/04* (2006.01)
*H04B 1/69* (2006.01)
*H04B 1/00* (2006.01)

(52) U.S. Cl. .................... 375/295; 375/130; 455/562

(58) Field of Classification Search ................. 375/295, 375/130, 141, 147, 385, 340, 324; 455/562.1, 455/522; 370/401, 338
See application file for complete search history.

(56) References Cited

U.S. PATENT DOCUMENTS

| 6,421,370 | B1 | 7/2002 | Yasaki | 375/141 |
| 6,862,462 | B2 * | 3/2005 | Hirabe | 455/562.1 |
| 2004/0114555 | A1 * | 6/2004 | Hayashi et al. | 370/329 |
| 2004/0202104 | A1 * | 10/2004 | Ishii et al. | 370/225 |
| 2005/0226183 | A1 * | 10/2005 | Penumetsa | 370/329 |
| 2006/0212732 | A1 | 9/2006 | Mashimo et al. | 713/300 |

FOREIGN PATENT DOCUMENTS

JP  11-155172  6/1999

OTHER PUBLICATIONS

U.S. Appl. No. 11/573,643 (Hara, et al.), pending.
U.S. Appl. No. 11/660,768 (Hara, et al.), pending.
U.S. Appl. No. 11/723,045 (Ido), pending.
Li Ning and Zhen Shaoren, "Lecture 4: Power Control and Energy-Saving Technology in Ad hoc Network (I)", China Data Communications, Mar. 2003, No. 3, pp. 102-106, China Academic Journal Electronic Publishing House. With English Language Transalation.
Chinese Office Action dated Dec. 19, 2008 in counterpart Chinese Patent Application No. 2006100581058. With English Language Translation.

* cited by examiner

*Primary Examiner*—Khai Tran
(74) *Attorney, Agent, or Firm*—Fitzpatrick, Cella, Harper & Scinto

(57) ABSTRACT

A terminal determined to be a communication partner in advance is subjected to transmission power control, and another terminal receives data with the maximum transmission power. Data to be transmitted to a plurality of terminals is also transmitted with the maximum transmission power.

7 Claims, 11 Drawing Sheets

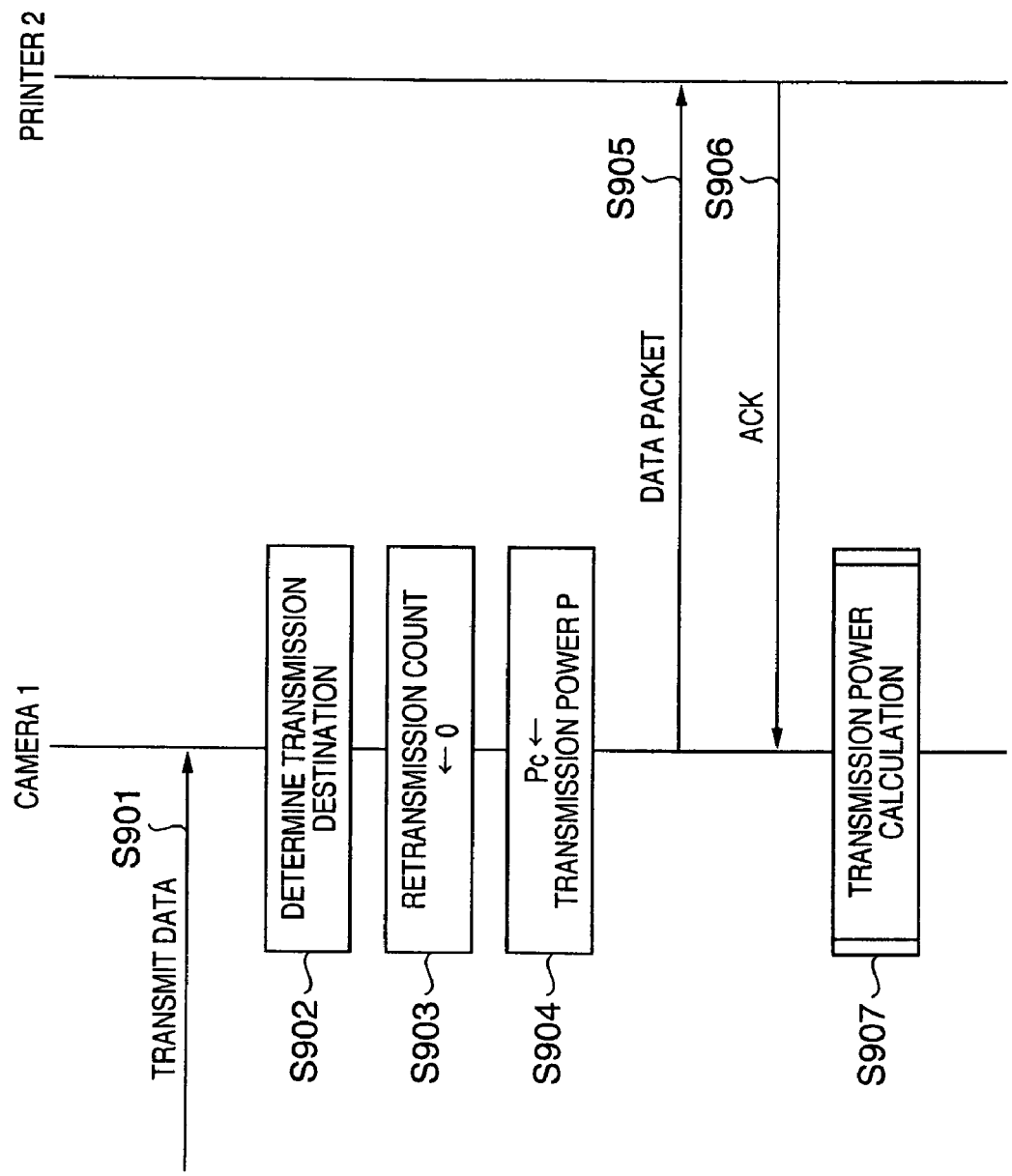

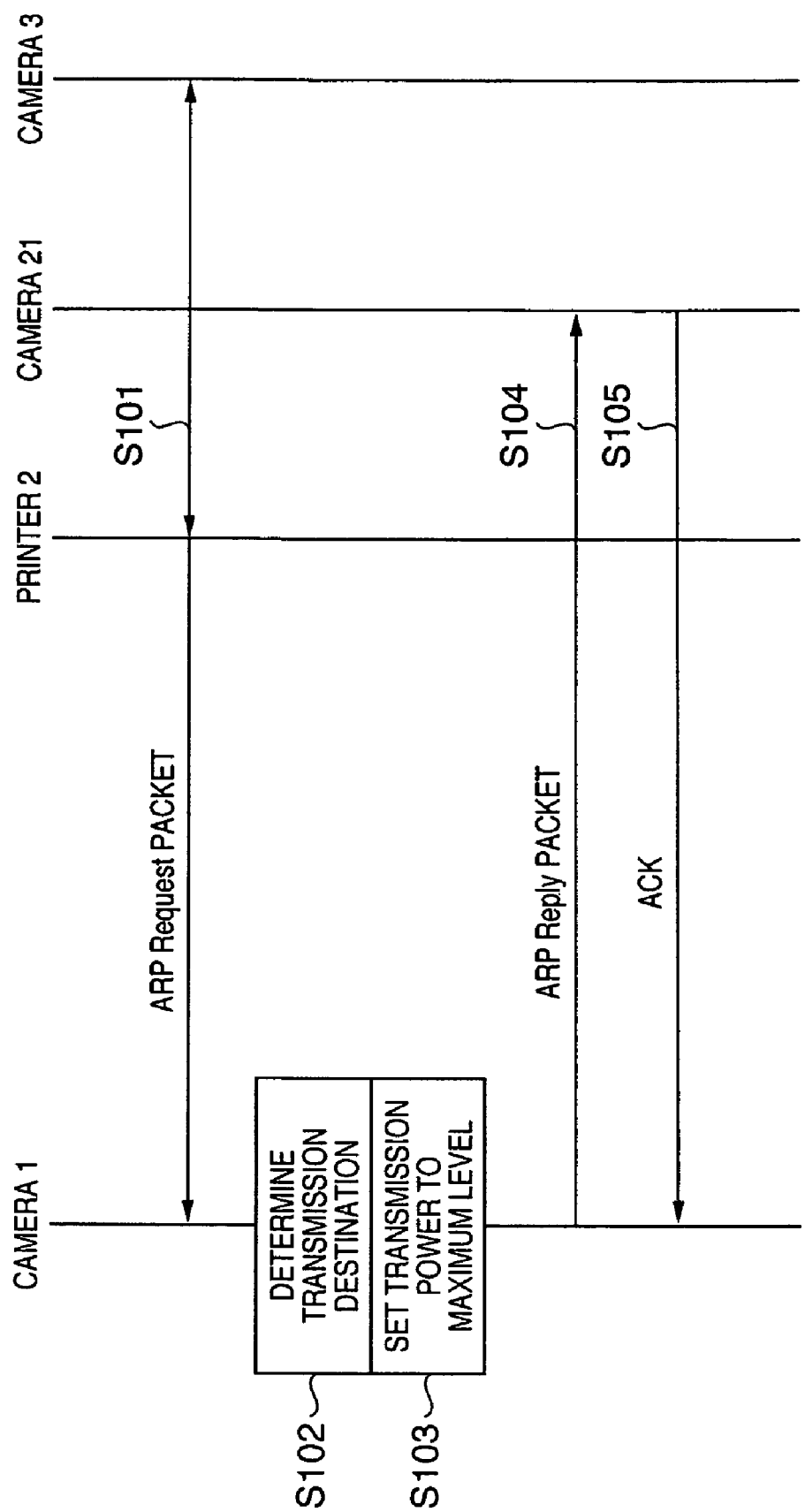

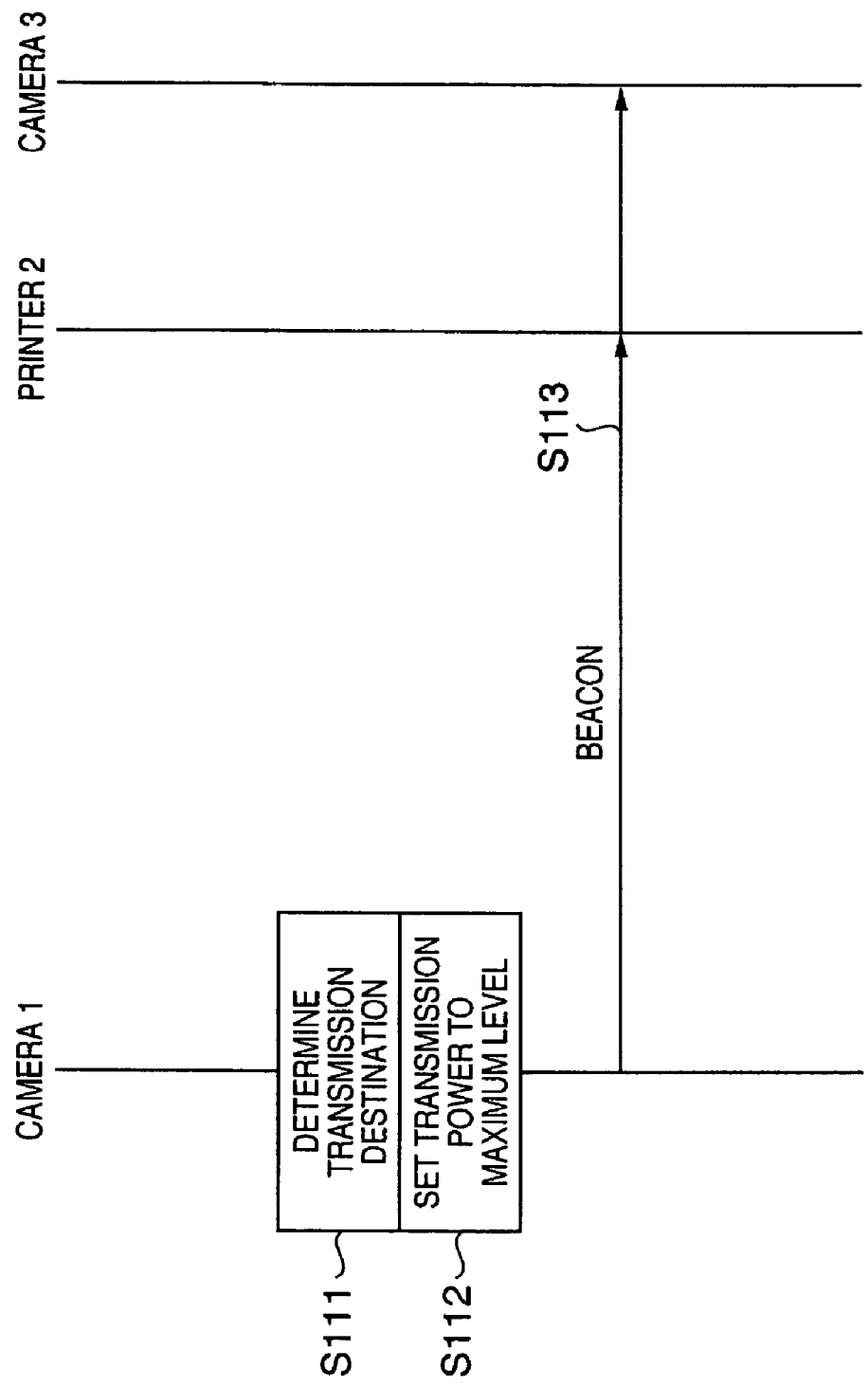

COMMUNICATION APPARATUS AND METHOD

FIELD OF THE INVENTION

The present invention relates to a communication apparatus and method and, more particularly, to a communication apparatus and method for performing transmission power control.

BACKGROUND OF THE INVENTION

A wireless communication environment always changes under the influence of a communication distance with a communication partner, external noise, the presence of an obstacle, or the like. To cope with such change in communication environment, a wireless communication apparatus performs transmission power control. Transmission power control is control of increasing (decreasing) transmission power in accordance with a communication error rate or information from a partner device, and minimizing the transmission output to continue communication, thereby setting an optimal transmission output.

When transmission power is larger than needed, not only power consumption increases, but also a neighboring wireless network is interfered with. Alternatively, when transmission power is too small, an error increases in a signal to be transmitted to a communication partner, resulting in communication failure in the worst case.

In an IEEE802.11 infrastructure mode, all wireless communication apparatuses communicate via a base station (access point). Hence, the base station can concentratedly control and manage the transmission power of the wireless communication apparatuses. Each wireless communication apparatus can perform transmission power control with the base station based on one-to-one communication.

Japanese Patent Laid-Open No. 11-155172 discloses a technique for decreasing the amount of interference between a wireless communication apparatus and a neighboring base station.

In an adhoc network in which wireless communication apparatuses directly communicate with each other without the intermediacy of any specific base station, in order to save power consumption, transmission power control can also be performed depending on the communication distance and communication interference level. However, since the base station is not present in the adhoc network, transmission power control of a plurality of wireless communication apparatuses cannot be concentratedly managed. Therefore, transmission power control based on one-to-one communication in the infrastructure network may pose a problem when a new wireless communication apparatus is to join a network, or when a wireless communication apparatus is to directly transmit information to a plurality of partners.

For example, when a new wireless communication apparatus is to join an IEEE802.11 adhoc network, other wireless communication apparatuses do not know the wave receiving state and communication distance between them. Assume that such new wireless communication apparatus broadcasts Probe Request in order to search for any available network. Upon reception of Probe Request, each wireless communication apparatus is to send back Probe Response. However, when the wireless communication apparatus transmits Probe Response with the same transmission power as that for a current communication partner, Probe Response may not reach the new wireless communication apparatus. In this case, the new wireless communication apparatus determines that no network is present around it, and cannot join the network.

Assume that the new wireless communication apparatus transmits an IP address confirmation request such as ARP Request in order to confirm an IP address. Upon reception of ARP Request, the wireless communication apparatus is to send back an IP address notification such as ARP Reply. However, when the wireless communication apparatus communicates with the same transmission power as that for the current communication partner, ARP Reply may not reach the new wireless communication apparatus. In this case, the new wireless communication apparatus may set an IP address identical to an IP address already in use. As a result, the communication cannot be normally performed, and data inconsistency occurs.

In the adhoc network, in addition to ARP Request, a network notification signal (BEACON signal) or the like may be required to be transmitted as a packet to the entire network or a plurality of terminals. In this case, when the packet is transmitted with the same transmission power as that for the current communication partner, the packet may not reach the entire network, and information may not be transmitted.

SUMMARY OF THE INVENTION

In view of the above problems in the conventional art, the present invention has an object to avoid, while performing transmission power control, problems as its side effect such as packet collision due to a hidden terminal problem, packet loss due to a shortage of transmission power, and IP address collision due to a shortage of transmission power, and keep the communication quality of an entire network normal.

In one aspect of the present invention, a communication apparatus includes a determination unit configured to determine a destination of data, and a control unit configured to control transmission power in accordance with determination of the determination unit.

The above and other objects and features of the present invention will appear more fully hereinafter from a consideration of the following description taken in connection with the accompanying drawing wherein one example is illustrated by way of example.

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 9 is a communication sequence diagram of the camera 1 and a printer 2 according to the embodiment of the present invention;

FIG. 10 is a sequence diagram when ARP Request and ARP Reply are transmitted/received between a camera 21 and the camera 1 according to the embodiment of the present invention; and FIG. 11 is a sequence diagram when the BEACON packet is transmitted by the camera 1 according to the embodiment of the present invention.

DETAILED DESCRIPTION OF THE PREFERRED EMBODIMENTS

Preferred embodiment(s) of the present invention will be described in detail in accordance with the accompanying drawings. The present invention is not limited by the disclosure of the embodiments and all combinations of the features described in the embodiments are not always indispensable to solving means of the present invention.

In this embodiment, in an IEEE802.11 adhoc mode, a digital camera (to be referred to as a camera hereinafter) serving as an image sensing apparatus is wirelessly connected to a printer serving as an output apparatus. A transmission power control capability unit operates between the camera and printer, thereby guaranteeing data communication without mismatch.

Figure 1:
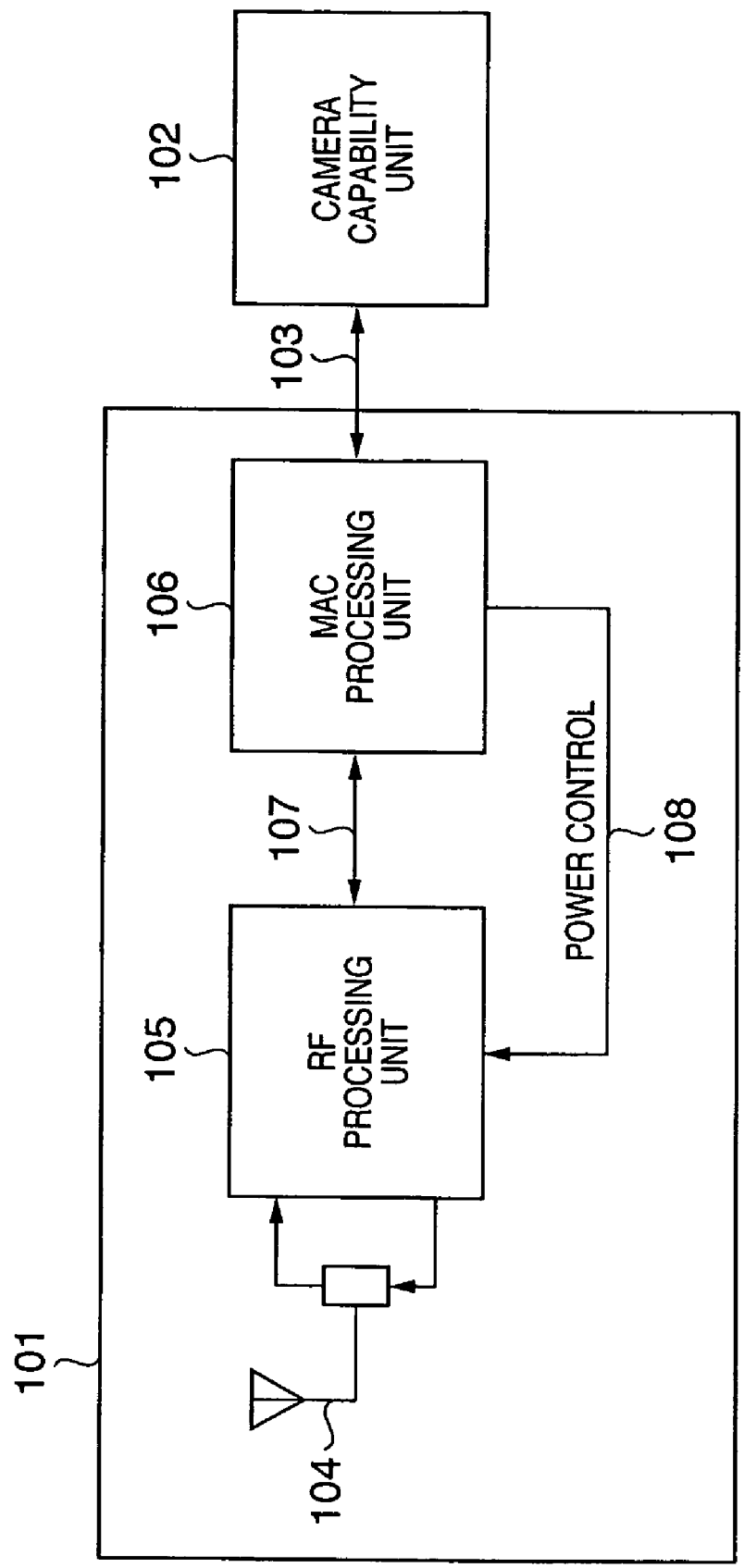
FIG. 1 is a block diagram of a camera according to an embodiment of the present invention.

FIG. 1 is a block diagram showing the arrangement of the camera according to this embodiment. The camera roughly includes a camera capability unit 102 and a wireless module 101. The camera capability unit 102 has a camera imaging capability, a TCP/IP (Transmission Control Protocol/Internet Protocol) data processing capability, and a control and data communication capabilities for the wireless module 101. The wireless module 101 is controlled by using a memory interface 103 such as an interface with a compact flash® memory. The wireless module 101 has an IEEE802.11 wireless LAN capability (PHY and MAC), and a communication capability with the camera capability unit 102. The wireless module 101 includes an MAC processing unit 106, RF processing unit 105, and antenna 104. The MAC processing unit 106 has MAC and PHY capabilities in the IEEE802.11 wireless LAN, the communication capability with the camera capability unit 102, and the control capability for the RF processing unit 105. The MAC processing unit 106 controls the RF processing unit 105 via a power control interface 108 and a transmission/reception processing interface 107. The transmission power of a packet is controlled via the power control interface 108. The RF processing unit 105 executes the IEEE802.11 PHY capability to transmit/receive data via the antenna 104. A packet destination to be subjected to transmission power control is determined in accordance with a program stored in a memory in the camera capability unit 102, and sent as an MAC address value to the MAC processing unit 106. The MAC processing unit 106 stores the MAC address of the destination to be subjected to transmission power control, which is sent from the camera capability unit 102. When the packet is to be transmitted, the MAC address of a packet destination is compared with that stored in advance as the destination to be subjected to transmission power control. As a result, when these MAC addresses are identical, the MAC processing unit 106 controls the RF processing unit 105 via the power control interface 108 to perform transmission power control. On the other hand, when the MAC addresses are different, the MAC processing unit 106 controls the RF processing unit 105 via the power control interface 108 to transmit the packet with a maximum transmission power. However, when a packet such as RTS (Request to send) as a transmission request signal, or CTS (Clear to send) as a reception preparation completion signal is to be received by all terminals, the MAC processing unit 106 transmits the packet with the maximum transmission power. When ACK (response signal) is not sent back for the transmission packet within a predetermined period of time, the transmission packet is retransmitted. The MAC processing unit 106 stores a retransmission count to determine transmission power to be used in the next transmission, by the following method.

Figure 2:
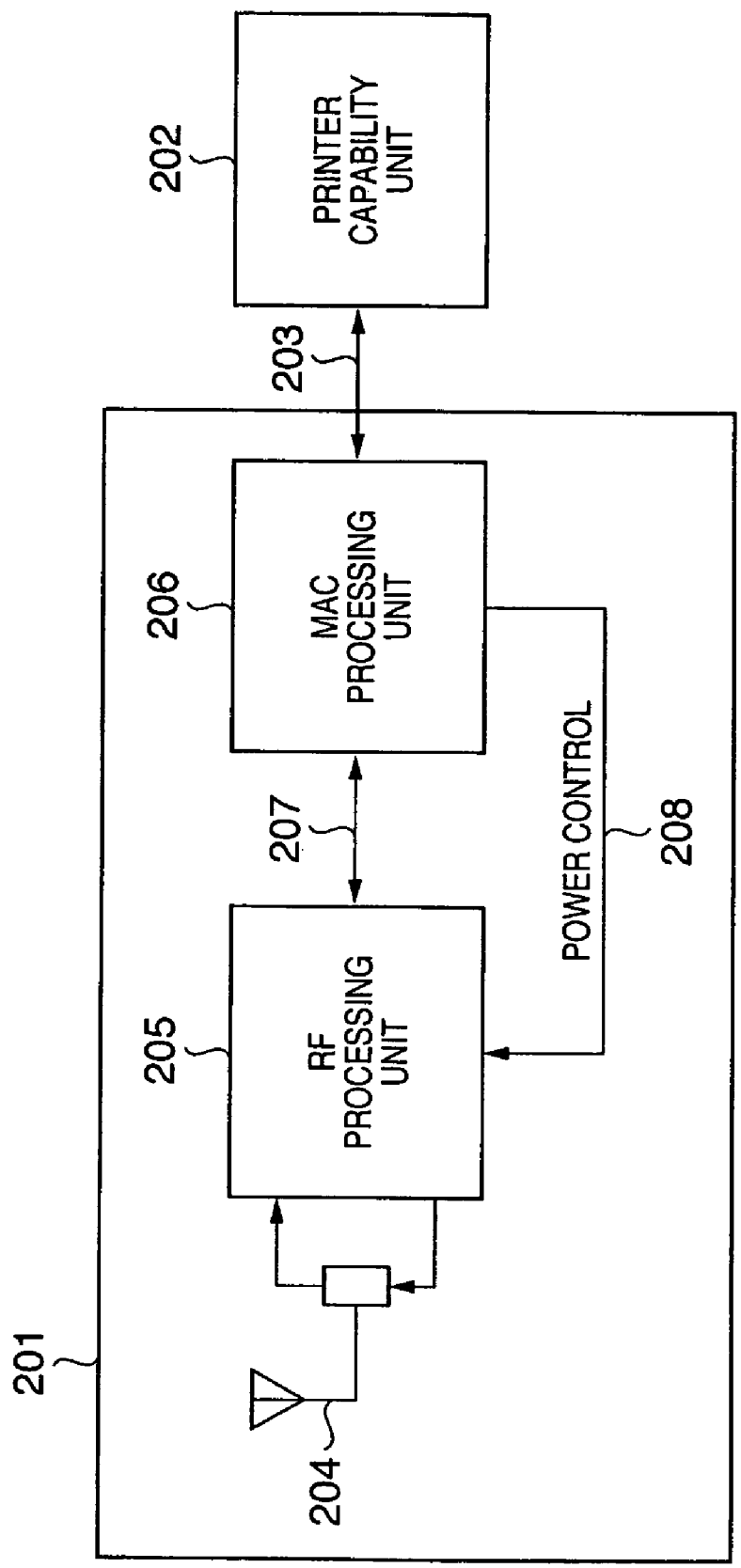
FIG. 2 is a block diagram of a printer according to the embodiment of the present invention.

FIG. 2 is a block diagram showing the arrangement of the printer according to this embodiment. The printer roughly includes a printer capability unit 202 and a wireless module 201. The printer capability unit 202 has a printer printing capability, a TCP/IP data processing capability, and a control and data communication capabilities for the wireless module 201. Since the wireless module 201 has the same arrangement as that of the wireless module 101 in FIG. 1, the detailed description of the wireless module 201 will be omitted.

Figure 3:
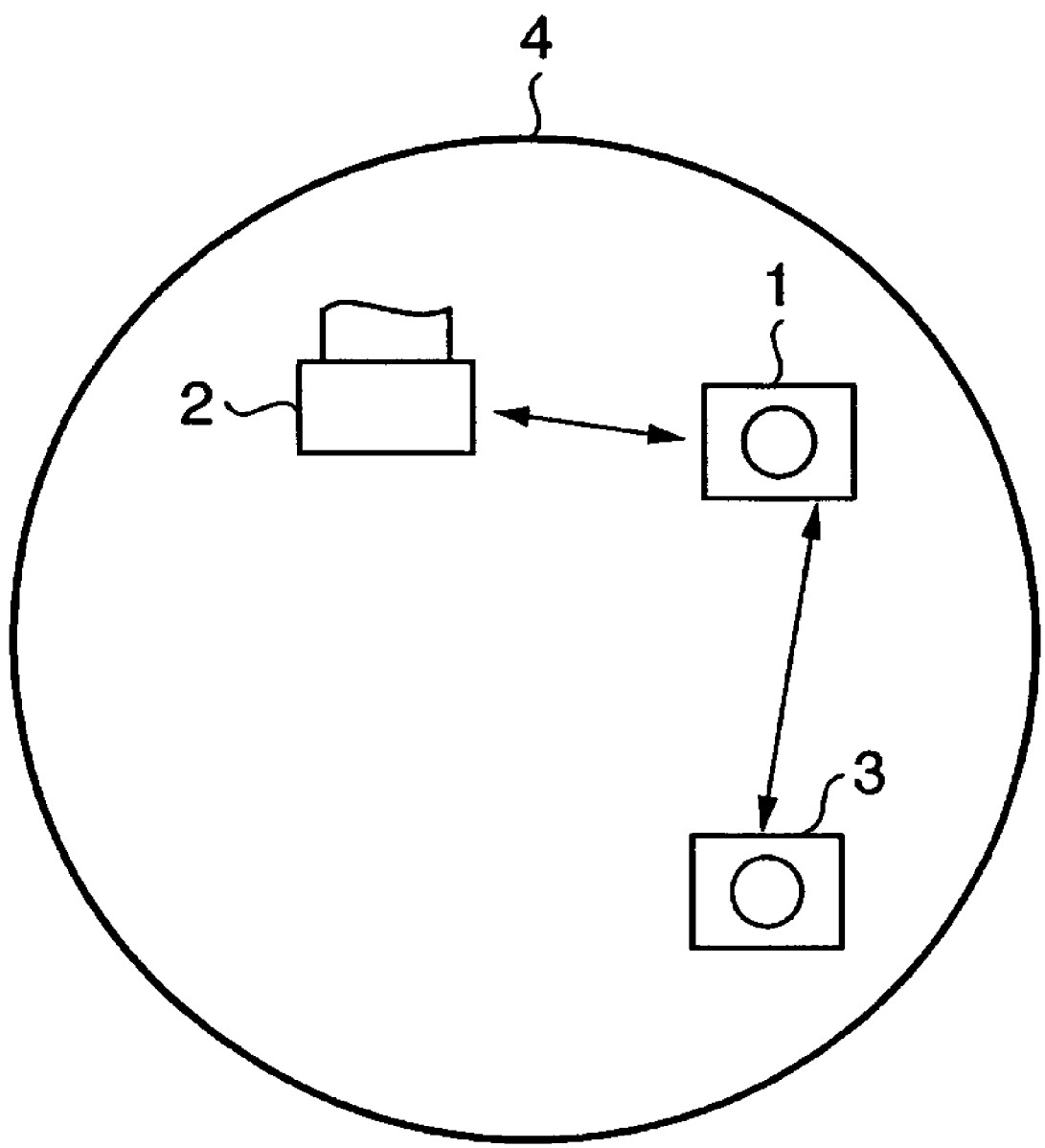
FIG. 3 is a schematic view of a network according to the embodiment of the present invention.

In this embodiment, as shown in FIG. 3, a digital camera (camera 1), printer (printer 2), and digital camera (camera 3) form the adhoc network. Assume that the digital camera (to be referred to as a camera 1 hereinafter) communicates with the printer (printer 2). In this situation, the printer 2 and the camera 1 communicate with each other, and form an IEEE802.11 adhoc network 4. The camera 1 performs data communication in order to transmit internal image data to the printer 2 to print the image data. At this time, the camera 1 performs transmission power control in the communication with the printer 2. Since the camera 1 is close to the printer 2, data is transmitted with small power. Similarly, when the camera 1 performs data communication with the camera 3, the camera 1 performs transmission power control in the communication with the camera 3. In this case, since the camera 1 is distant from the camera 3, data is transmitted with large power. Note that each of the cameras 1 and 3 has the arrangement shown in FIG. 1, and the printer 2 has the arrangement shown in FIG. 2. The MAC processing unit 106 of the camera 1 stores the MAC addresses of the printer 2 and camera 3, as the MAC addresses of the destinations to be subjected to transmission power control.

Figure 7:
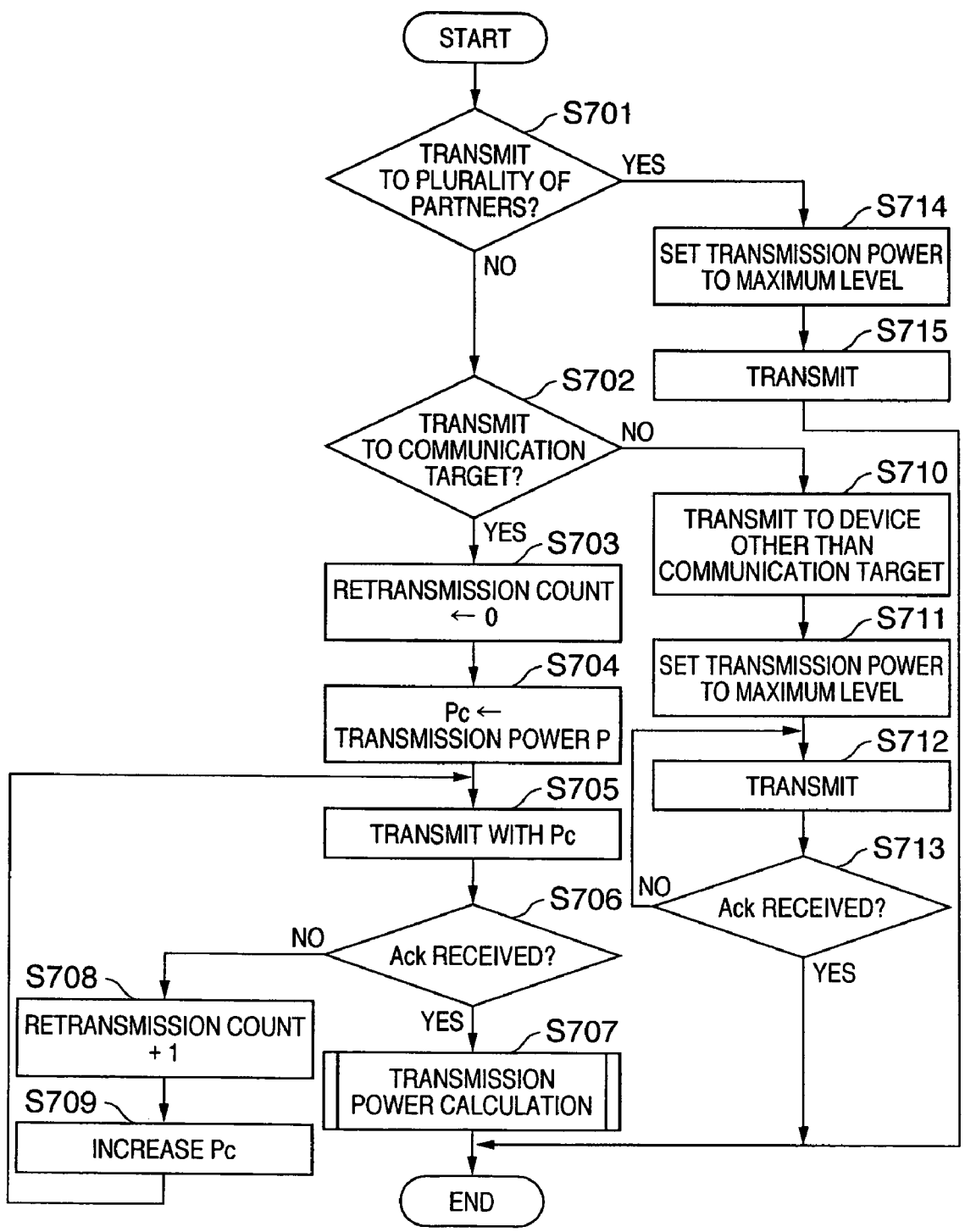
FIG. 7 is a flowchart showing an operation in packet transmission of a camera 1 according to the embodiment of the present invention.

FIG. 7 is a flowchart showing the operation of the camera 1 to transmit a packet.

Figure 6:
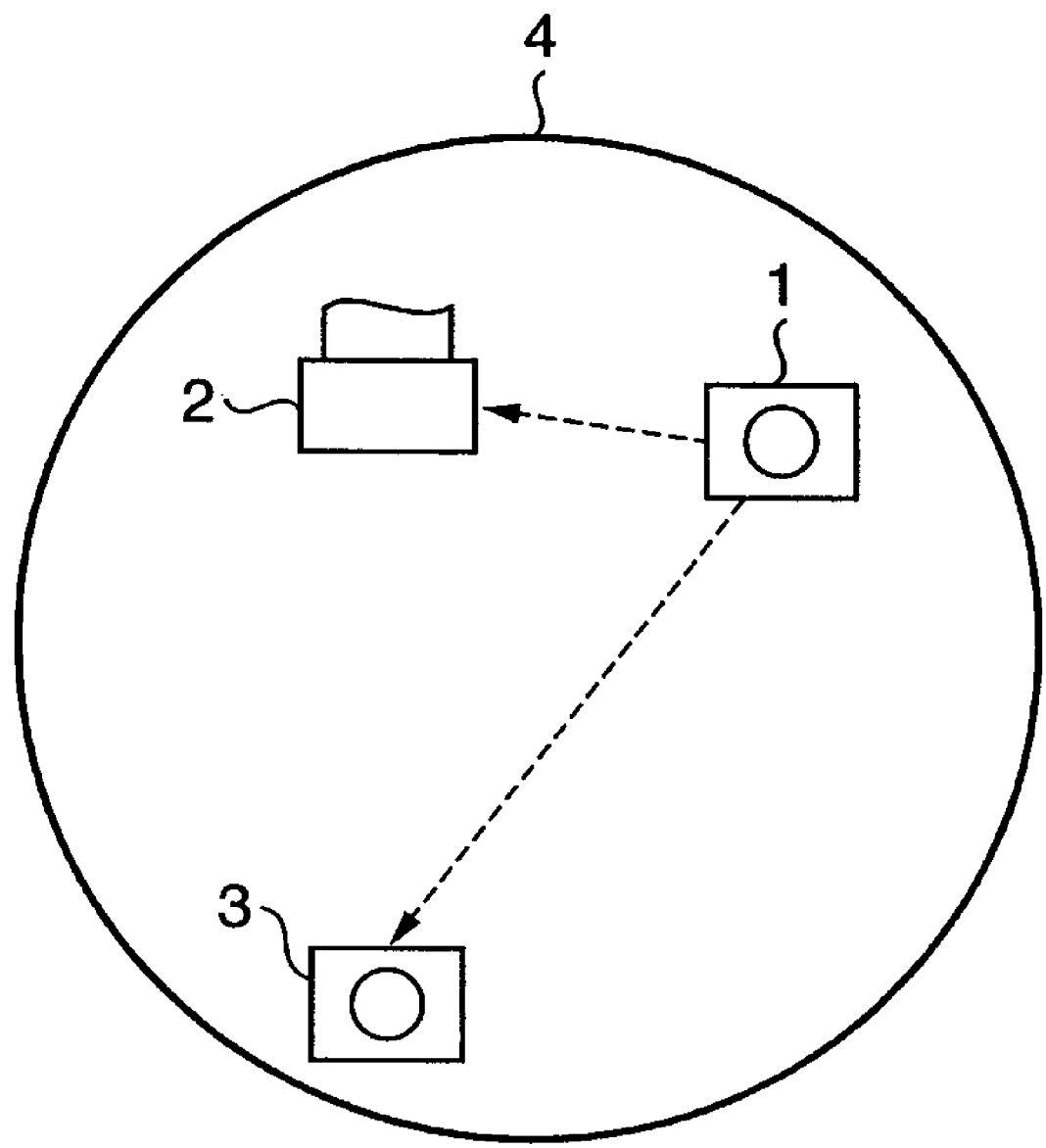
FIG. 6 is a schematic view of a network, and shows an example of the transmission/reception of a BEACON packet according to the embodiment of the present invention.

In FIG. 7, the camera 1 determines whether a transmission packet is a packet to be transmitted to a plurality of partner apparatuses (step S701). When the camera 1 is to transmit a BEACON signal as a broadcast packet to the network 4 as shown in FIG. 6, the camera 1 determines that the packet is to be transmitted to a plurality of partner apparatuses. Accordingly, the MAC processing unit 106 sets, via the power control interface 108, the transmission power of the RF processing unit 105 to maximum level (step S714). The BEACON signal is then broadcasted with the maximum transmission power (step S715). Note that since ACK is not required to be sent back for this broadcast packet, the transmission process ends. As described above, when transmitting the packet such as the broadcast packet to be transmitted to a plurality of communication partners, the transmission power is set to maximum level to transmit the packet information to the entire network. This can prevent inconsistency, i.e., this can prevent the communication apparatus which cannot receive the packet from forming another new network.

FIG. 11 is a sequence diagram when the camera 1 transmits a BEACON signal. The MAC processing unit 106 of the camera 1 determines the transmission destination of the BEACON signal (step S111). Since the BEACON signal is a broadcast packet, the MAC processing unit 106 sets the transmission power of the RF processing unit 105 to maximum level (step S112). The RF processing unit 105 then transmits the BEACON signal with the maximum transmission power (step S113). This BEACON signal reaches the entire network 4, and is received by the printer 2 and camera 3.

Returning back to FIG. 7, when the transmission packet is not a packet to be transmitted to a plurality of partner apparatuses, the camera 1 determines whether the destination of the transmission packet is a communication target (step S702). When the destination of the transmission packet is the printer 2, the address of the transmission packet destination matches the MAC address of the destination to be subjected to transmission power control, which is sent from the camera capability unit 102, Hence, the camera 1 determines that the transmission packet is a packet to be transmitted to the communication target. In order to transmit the packet to the communication target, a retransmission count counter is cleared (step S703), and a variable Pc to be used in packet transmission is set to a present transmission power value P (step S704). The transmission packet is then transmitted with the transmission power Pc (step S705). After that, the camera 1 determines whether ACK serving as a response signal for the transmission packet can be received (step S706). When ACK is received, the flow shifts to a transmission power calculation routine shown in FIG. 8 (step S707).

When ACK cannot be received within a predetermined period of time, the retransmission count counter is incremented (+1) (step S708). The variable Pc representing transmission power increases by a predetermined value (step S709), and the packet is retransmitted with the increased transmission power Pc (step S705).

Figure 8:
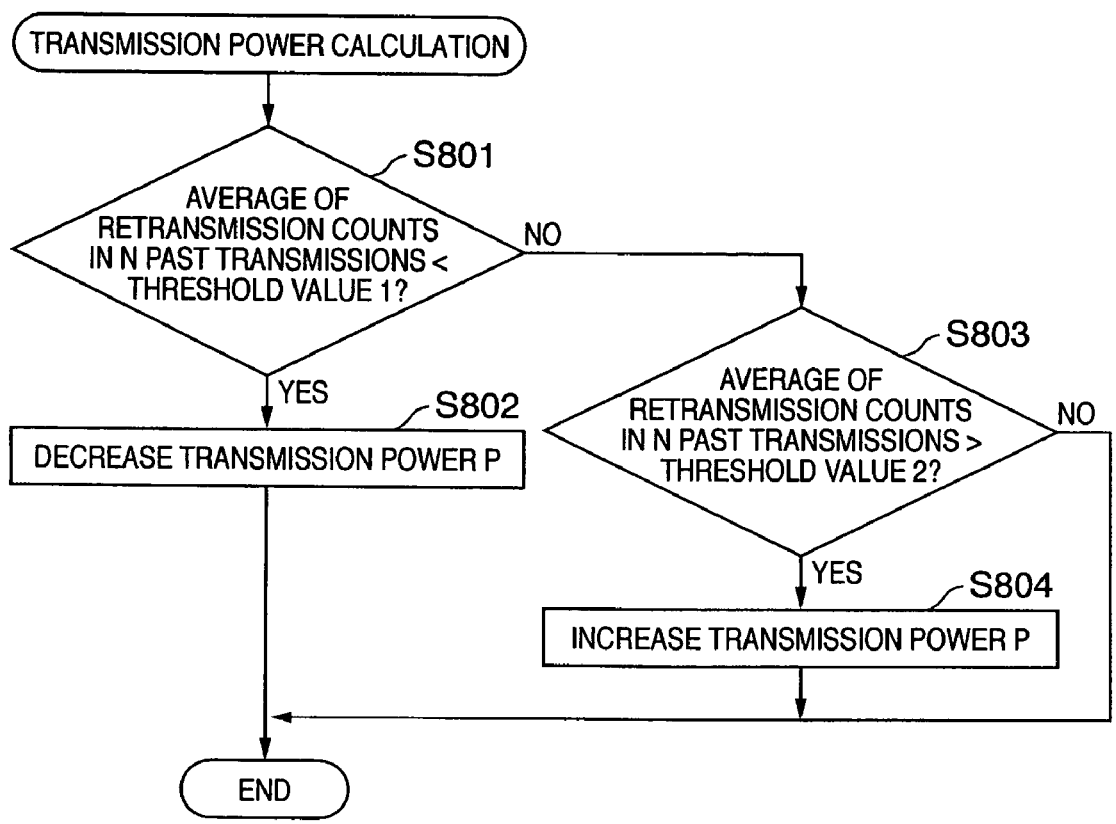
FIG. 8 is a flowchart of transmission power calculation of the camera 1 according to the embodiment of the present invention.

The transmission power calculation routine will be described as shown in FIG. 8. When the average of the retransmission counts in N-time transmissions is smaller than threshold value 1 (step S801), the transmission power P decreases by a predetermined value (step S802). When the average of the retransmission counts in N past transmissions is larger than threshold value 2 (threshold value 2>threshold value 1) (step S803), the transmission power P is increased by a predetermined value (step S804). The average of the retransmission counts in N past transmissions is equal to or larger than threshold value 1, and equal to or smaller than threshold value 2, the present value of the transmission power P remains unchanged.

FIG. 9 is a sequence diagram when the camera 1 transmits the packet to the printer 2. First, the MAC processing unit 106 of the camera 1 receives a data transmission instruction from the camera capability unit 102 (step S901), and determines the transmission destination of the transmission packet (step S902). When the transmission destination is the printer 2, the transmission destination is the communication target. Hence, the retransmission count counter is cleared (step S903) to decide transmission power (step S904). The decided transmission power is set to the RF processing unit 105 to transmit the data packet to the printer 2 (step S905). Upon reception of the data packet, the printer 2 transmits ACK. When the camera 1 receives ACK (step S906), the camera 1 performs transmission power calculation for the subsequent packet transmission (step S907).

Figure 4:
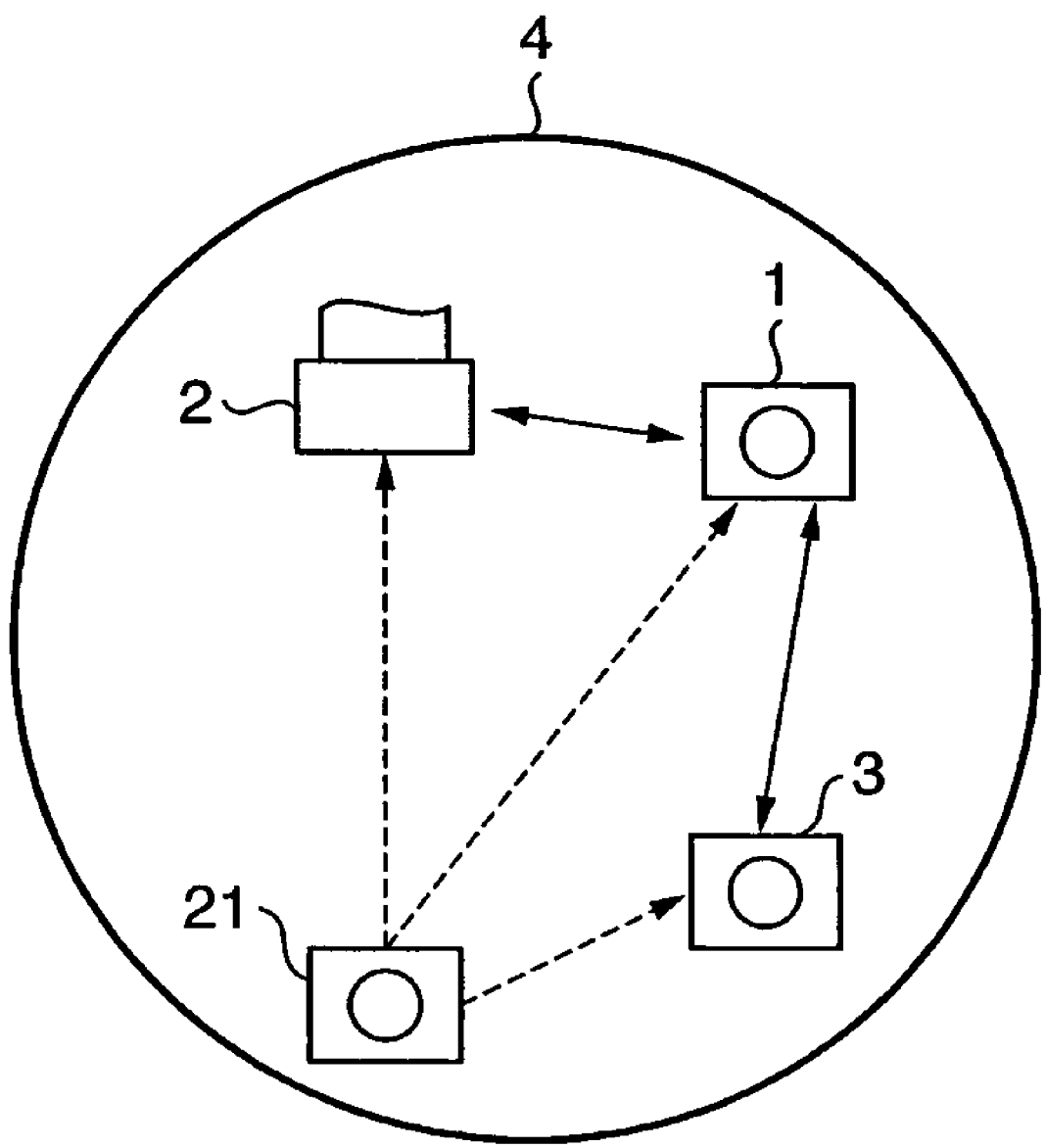
FIG. 4 is a schematic view of a network, and shows an example of the transmission/reception of an ARP Request packet according to the embodiment of the present invention.
Figure 5:
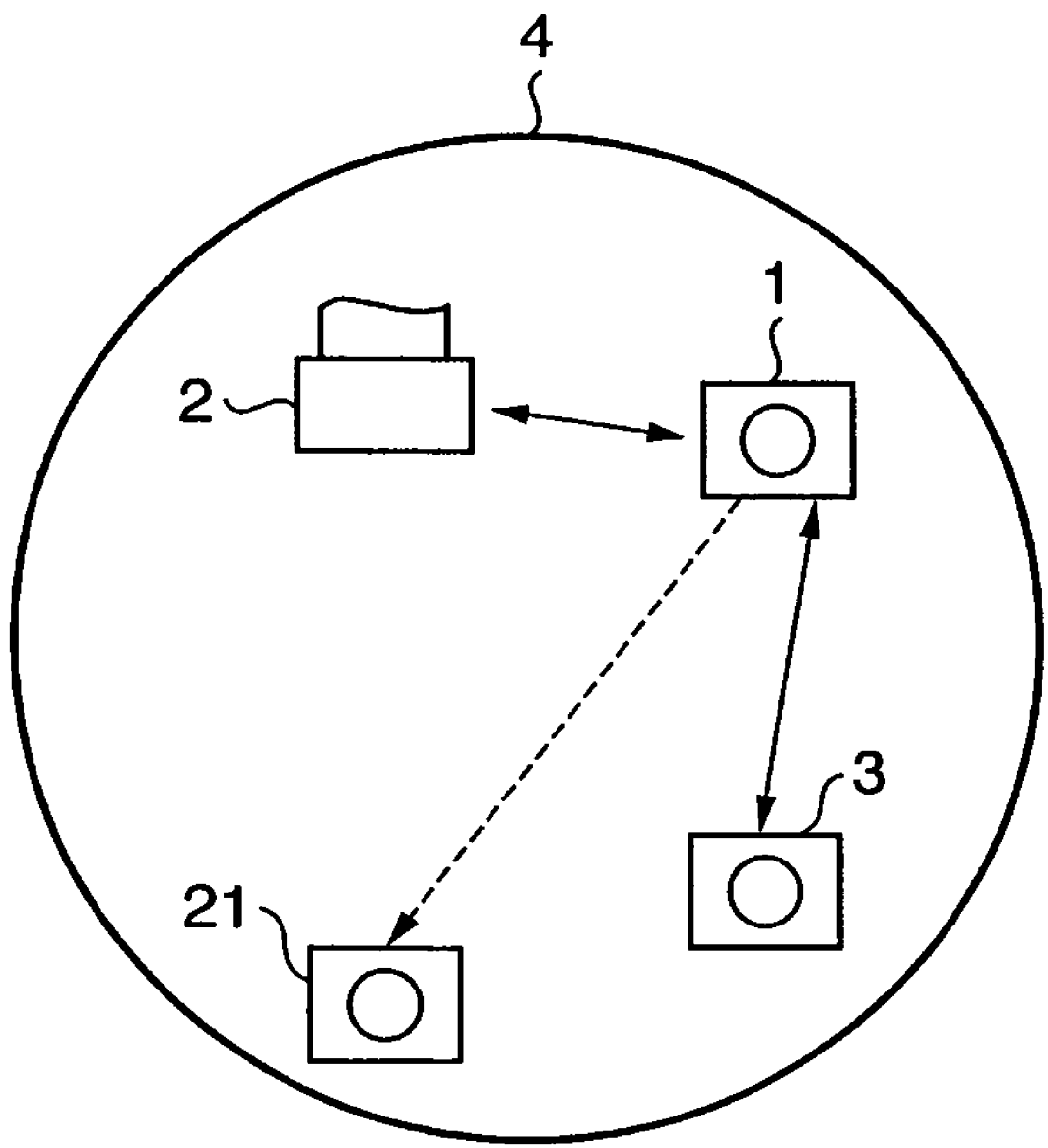
FIG. 5 is a schematic view of a network, and shows an example of the transmission/reception of an ARP Reply packet according to the embodiment of the present invention.

Assume that a new camera 21 is to join the adhoc network 4 in FIG. 1, as shown in FIG. 4. The camera 21 broadcasts, to the adhoc network 4, an ARP (Address Resolution Protocol) Request packet for confirming an IP address. Upon reception of this ARP Request packet, the camera 1 sends back ARP Reply to the camera 21 as shown in FIG. 5. The camera 21 serving as the ARP Reply transmission destination is not a device having the MAC address stored in advance in the MAC processing unit 106 of the camera 1. Hence, the camera 1 determines that the ARP Reply destination is not the communication target (step S710), and sets the transmission power to maximum level (step S711). The camera 1 transmits ARP Reply with a maximum transmission power (step S712). The camera 21 sends back ACK upon reception of ARP Reply, and the camera 1 determines whether ACK can be received (step S713). When ACK is received, the process ends. When ACK cannot be received within a predetermined period of time, ARP Reply is retransmitted.

FIG. 10 is a sequence diagram of the camera 1 and the camera 21 which is to newly join the network 4.

In order to join the network 4, the camera 21 broadcasts an ARP Request packet (step S101). Since the camera 1 is to transmit an ARP Reply packet upon reception of this ARP Request packet, the MAC processing unit 106 determines the transmission destination of this packet (step S102). The packet destination is not the communication target, and the MAC processing unit 106 sets the transmission power of the RF processing unit 105 to maximum level (step S103). The RF processing unit 105 transmits the ARP Reply packet with a maximum transmission power to the camera 21 (step S104). Accordingly, the probability of the ARP Reply packet reaching the camera 21 becomes high to prevent IP data interference due to the IP address which is identical to that of the camera 21. Note that the camera 1 receives ACK for this packet (step S105). However, since the camera 21 is not the communication apparatus determined to be a communication partner in advance, transmission power calculation is not performed after receiving ACK.

When the camera 1 receives a Probe Request packet broadcasted by the camera 21, it transmits a Probe Response packet to the camera 21. In this case, since the transmission destination of the Probe Response packet is not the communication target (step S710), the camera 1 sets the transmission power to maximum level (step S711), and transmits the Probe Response packet (step S712). The camera 1 then determines the presence of ACK (step S713). When ACK is received, the process ends. When ACK is not received, the Probe Response packet is retransmitted.

As many apparently widely different embodiments of the present invention can be made without departing from the spirit and scope thereof, it is to be understood that the invention is not limited to the specific embodiments thereof except as defined in the appended claims.

This application claims the benefit of Japanese Application No. 2005-057447, filed Mar. 2, 2005, which is hereby incorporated by reference herein in its entirety.

What is claimed is:

1. A communication apparatus operable in an ad-hoc network which includes at least the communication apparatus and a communication partner, comprising:

a determination unit configured to determine a destination to transmit data; and a control unit configured to control transmission power in accordance with determination of said determination unit, wherein in a case tat the destination to transmit the data is determined to be a plurality of communication partners broadcasted simultaneously, the control unit controls the transmission power to a predetermined high transmission power, and in a case that the destination to transmit the data is determined to be a communication partner serving as a communication target, the control unit controls the transmission power to a transmission power according to the communication target.

2. The apparatus according to claim 1, wherein said control unit controls transmission power in accordance with determination of said determination unit when the communication apparatus and at least one communication partner directly communicate with each other.

3. The apparatus according to claim 1, further comprising:
a storage unit configured to store identification information of the communication partner,
wherein said determination unit determines whether said storage unit stores the destination of the data.

4. The apparatus according to claim 1, wherein said determination unit determines whether the destination of the data is a first communication partner serving as a communication target, a second communication partner other than that serving as the communication target, or a plurality of communication partners,
wherein said control unit controls the transmission power to the predetermined high transmission power in a case that the destination of the data is the second communication partner other than that serving as the communication target.

5. The apparatus according to claim 1, wherein the predetermined high transmission power is a maximum transmission power.

6. The apparatus according to claim 1, wherein said control unit performs transmission power control based on a retransmission count, if the destination of the data is the communication, partner serving as the communication target.

7. A communication method for a communication apparatus operable in an ad-hoc network which includes at least the communication apparatus and a communication partner, comprising the steps of:
determining a destination to transmit data or type of data;
controlling transmission power of the communication apparatus in accordance with the determined destination or type of the data, wherein, in a case that the destination to transmit the data is determined to be a plurality of communication partners broadcasted simultaneously, the control unit controls the transmission power to a predetermined high transmission power, and in a case that the destination to transmit the data is determined to be a communication partner serving as a communication target, the control unit controls the transmission power to a transmission power according to the communication target; and
transmitting the data from the communication apparatus according to the controlled transmission power.

* * * * *